H. C. HILL.
ATTACHMENT FOR TESTING OR TRIAL FRAMES.
APPLICATION FILED OCT. 28, 1909.
955,333.
Patented Apr. 19, 1910.
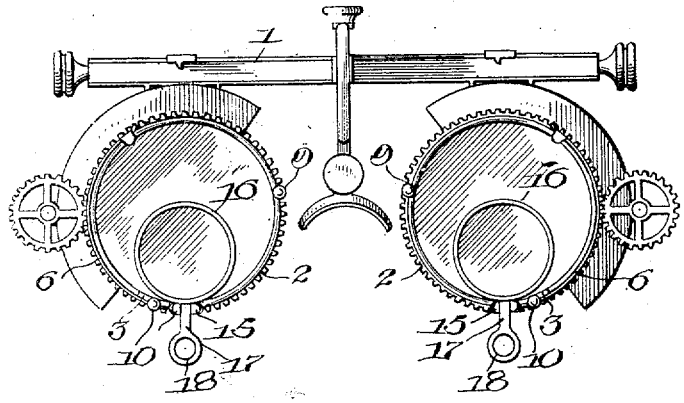
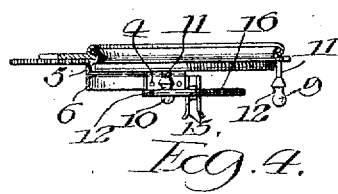
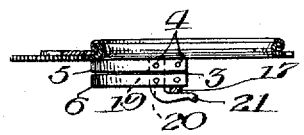
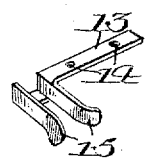
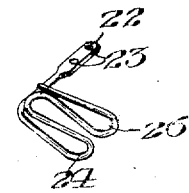
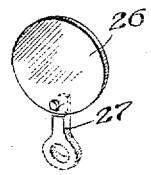
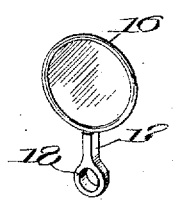
Witnesses
Inventor
Hermon C. Hill
by Benj. T. Roodhouse
Atty.

UNITED STATES PATENT OFFICE.

HERMON C. HILL, OF BENTON HARBOR, MICHIGAN.

ATTACHMENT FOR TESTING OR TRIAL FRAMES.

955,333.  Specification of Letters Patent.  Patented Apr. 19, 1910.

Application filed October 28, 1909. Serial No. 525,143.

*To all whom it may concern:*

Be it known that I, HERMON C. HILL, a citizen of the United States, residing at Benton Harbor, in the county of Berrien and State of Michigan, have invented a new and useful Attachment for Testing or Trial Frames, of which the following is a specification.

As is well known, trial or testing frames comprise spectacle frames having means for adjusting them to the face of the person whose eyes are to be tested, and other means for receiving and holding the various lenses and prisms which are employed in the tests. As such frames are at present made, the lenses and prisms which they can receive and hold are of a full and uniform size. It is extremely desirable to be able to simultaneously test the eyes for both near and far vision, so that when the far vision has been corrected, you can proceed at once to get the proper correction for near vision, and the patient can compare the results obtained with the results of his corrected vision instead of with the imperfect images given by his uncorrected vision. In order to accomplish this the trial frames should have provision for receiving lenses of different sizes, and my invention has for its main object the accomplishment of this result.

My invention may be used in place of or in connection with devices now in use to hold lenses and prisms of regular size. To effectuate this object, I have provided the mechanism shown in the accompanying drawing, in which,—

Figure 1 is a front elevation of a trial frame with my invention applied thereto; Fig. 2 is a detail plan of the usual retaining spring with my invention applied thereto; Fig. 3 is a detail plan similar to that shown in Fig. 2, with a modified form of retaining clip; Fig. 4 is a detail of one form of retaining clip; Fig. 5 is a detail of another form of retaining clip; Fig. 6 is a perspective of a small lens and lens frame for making the bi-focal tests; and Fig. 7 is a perspective of a small rimless lens with a shank for assembling with the clip.

Similar reference numerals refer to similar parts throughout the several views.

The numeral 1 designates a trial frame, which has suitably secured thereto a rotatable lens retaining ring, 2. Extending from and in front of the ring, 2, is a bracket, 3, to which are attached by means of screws, 4, two lens retaining springs, 5 and 6. Two studs, 9 and 10, also extend from the front of the ring, 2, and these studs are provided with two annular grooves, 11 and 12, which are adapted to receive the opposite edges of the lenses held by the retaining springs.

To hold smaller lenses for making the bi-focal tests in proper position in the frame while the larger lenses are in position, I provide a spring clip comprising the shank, 13, having the holes, 14, therein, through which and by means of the same screws, 4, which secure the retaining springs in position, it is secured to the bracket, 3. The outer or unattached end of the shank, 13, is provided with the substantially parallel spring jaws, 15. This construction is clearly shown in Figs. 1, 2, and 4.

The small lens for making the bi-focal tests, as clearly shown in Fig. 6, is carried in a mounting comprising an annular rim, 16, for holding the edge of the lens, a shank, 17, of rectangular cross-section, attached to said rim, and a handle piece, 18, for grasping with the fingers upon the unattached end of the shank. The rectangular shank, 17, is slipped between the spring jaws, 15, thereby securing the proper location and attachment of the small lenses for making the bi-focal tests while the large lenses are in position in the frame.

In Fig. 7 is illustrated a rimless lens, 26, having a shank, 27, by means of which it is secured to the clip. The spring clips are sufficiently deep to permit of the insertion of a plurality of small lenses therein, so that different curvatures may be combined in making the tests as is done with the large lenses.

Fig. 3 shows a modified form of the spring clip for holding the small lenses in the frame comprising a shank, 19, similar to the shank, 13, having holes, 20, therein, through which the screws, 4, pass to secure it to the bracket, 3. The spring clip in this form, however, consists of but a single spring arm, 21, which is at substantial right angles with the shank, and extends in front of and parallel with the front of the bracket, 3, and forms therewith a place for the reception of the shank, 17, of the lens mounting.

In Fig. 5 another modification of the spring clip is shown which is formed entirely from an integral strip of metal. In this form the shank portion, 22, should be flattened and may be provided with holes, 23, for the screws, 4, or may be inserted between the bracket, 3, and the bases of the springs, 5 and 6, where it will be securely held when the screws, 4, are screwed firmly down to hold the springs in position. From the shank portion the strip of metal is bent substantially at right angles first outwardly and back, and then outwardly and back again to form the loops or jaws, 24 and 25.

With all forms of my device it will be perceived that I have provided a very simple lens mounting and means for attaching same to a trial frame so that the bi-focal tests may be made with the regular lenses in position.

Having described my invention, what I claim as new and desire to secure by Letters Patent is:—

1. In combination with an eye testing or trial frame, a lens mounting with a projection thereon, and a member attached to said frame for receiving and holding the projection on said mounting.

2. In combination with an eye testing or trial frame, a lens mounting having a projection extending therefrom, and a spring holder comprising a shank secured to said trial frame and a spring member for frictionally engaging and securing said projection.

3. In combination with an eye testing or trial frame, a lens mounting comprising a lens holding rim having a projection extending therefrom, and a spring holder comprising a shank for assembly with said trial frame and parallelly extending jaws for frictionally engaging and securing said projection.

In testimony whereof, I hereunto set my hand, in the presence of two witnesses.

HERMON C. HILL.

Witnesses:
 NELLIE A. BURKE,
 HENRY V. TUTTON.